(No Model.) 3 Sheets—Sheet 1.
H. LEMP & W. B. LEWIS.
ELECTRIC METAL WORKING APPARATUS.
No. 556,426. Patented Mar. 17, 1896.
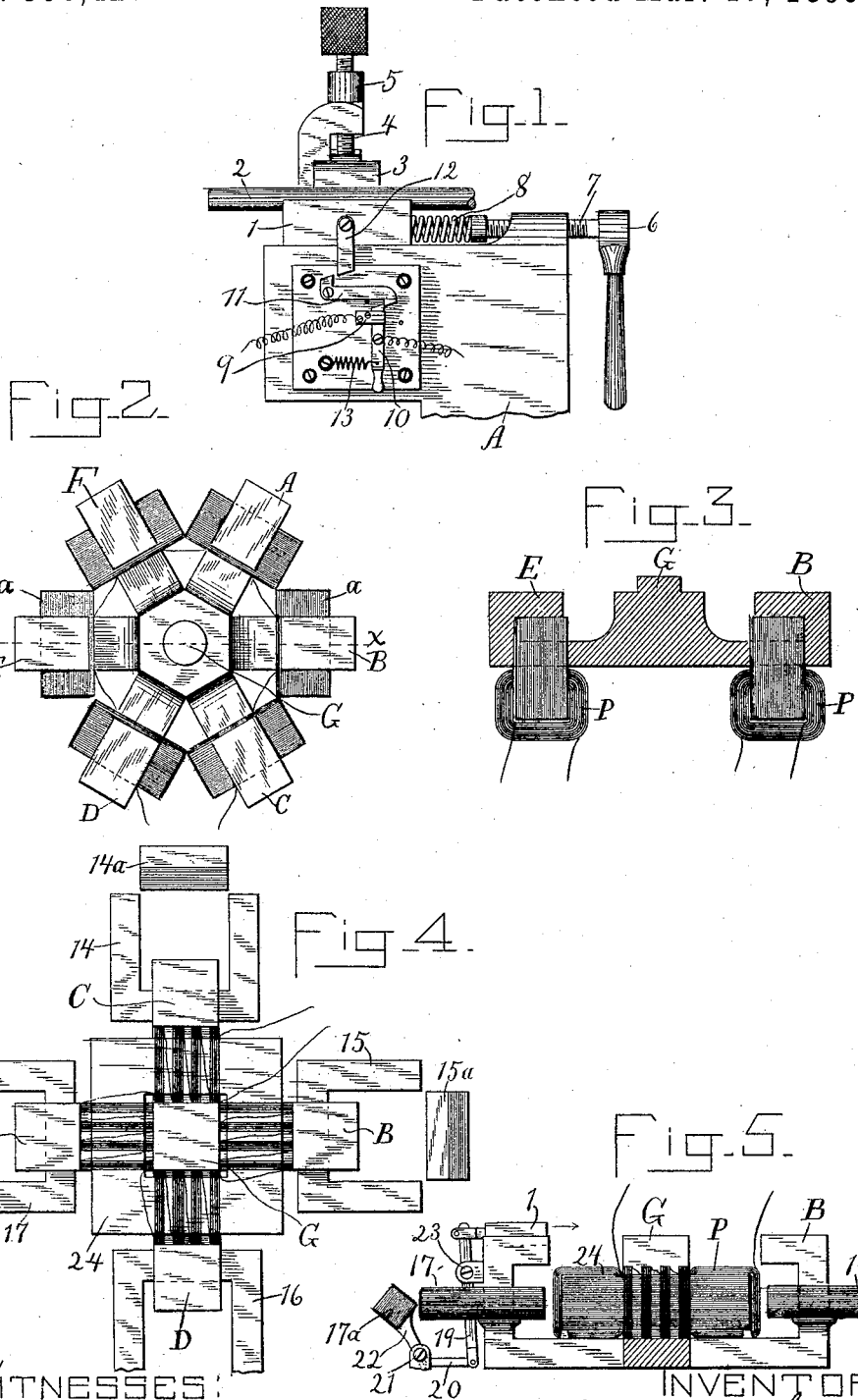
WITNESSES: INVENTORS:

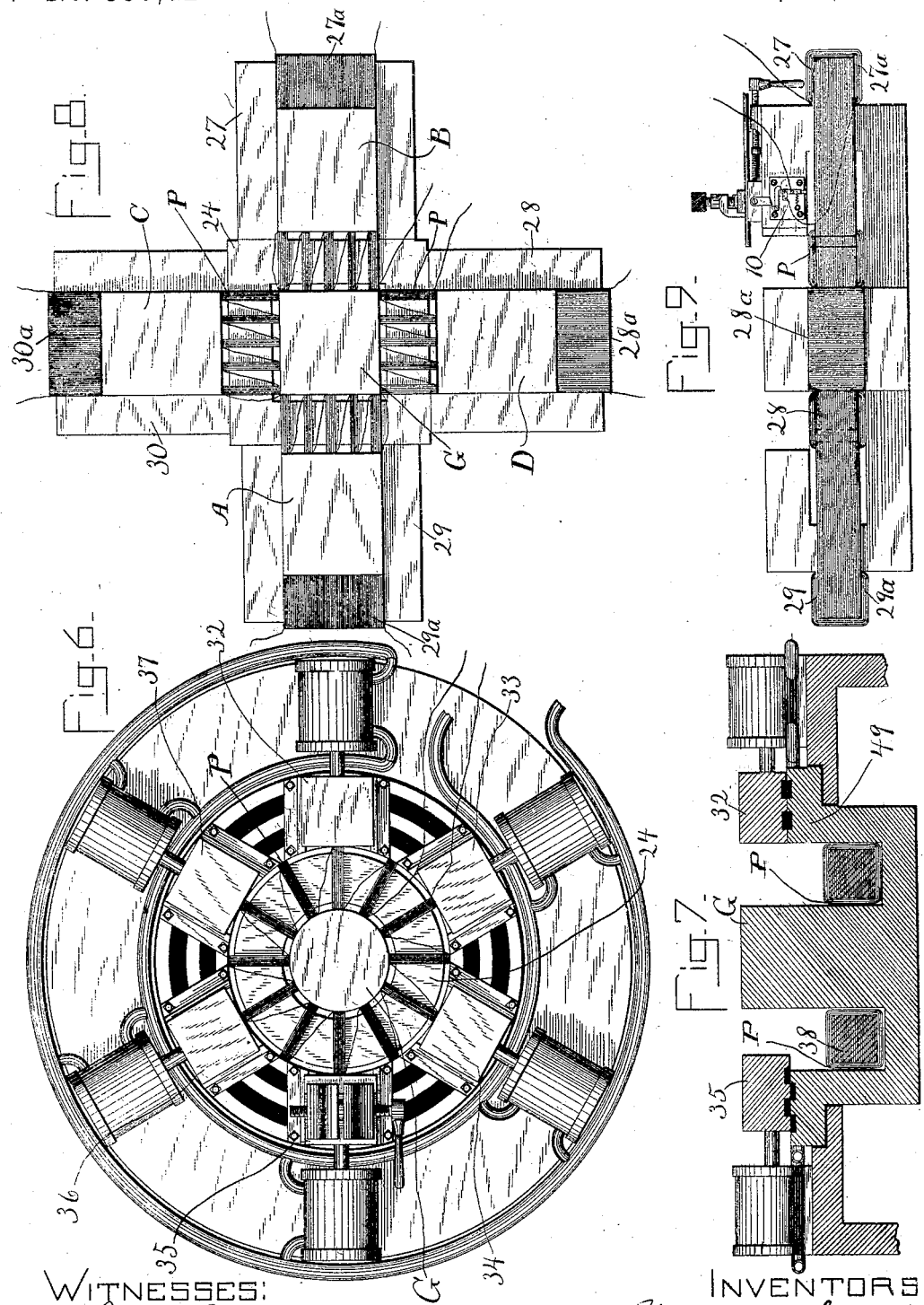

(No Model.) 3 Sheets—Sheet 3.
H. LEMP & W. B. LEWIS.
ELECTRIC METAL WORKING APPARATUS.
No. 556,426. Patented Mar. 17, 1896.
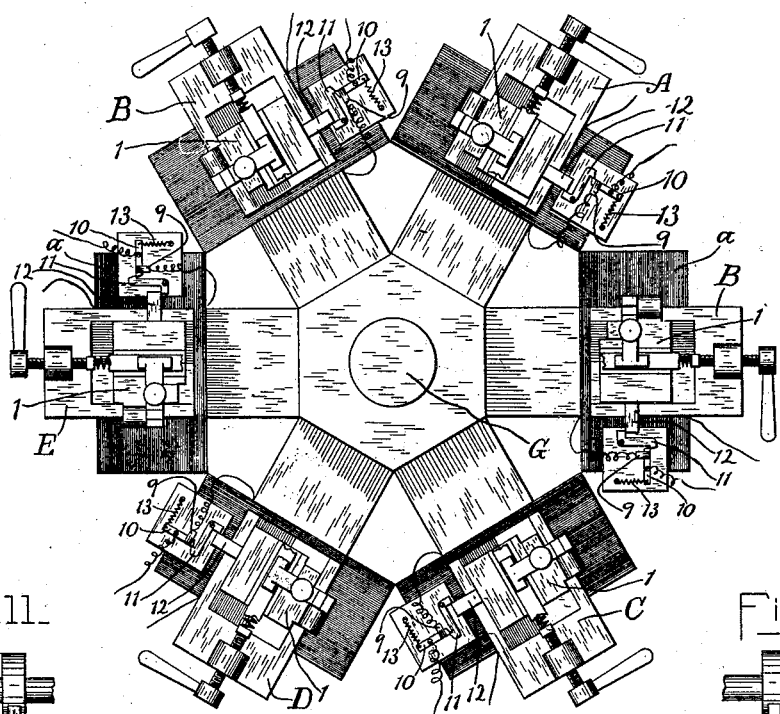
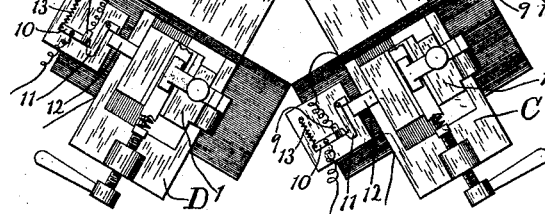
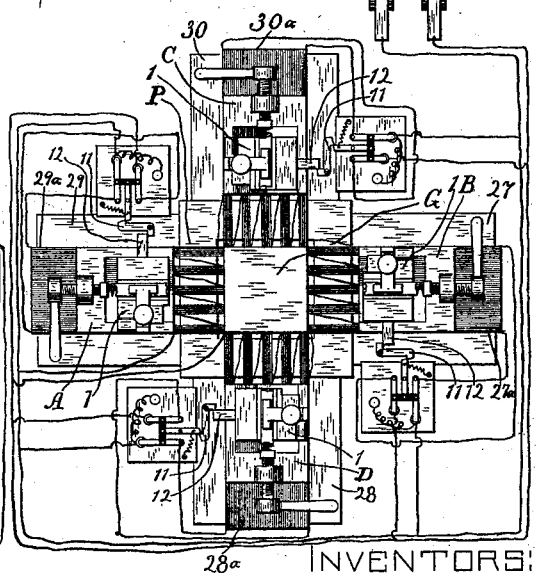
WITNESSES:
Wm H Capel.
Thos. F. Cowey.
INVENTORS:
Warren B. Lewis
Hermann Lemp
By H. C. Townsend
Atty.

UNITED STATES PATENT OFFICE.

HERMANN LEMP AND WARREN B. LEWIS, OF LYNN, MASSACHUSETTS, ASSIGNORS TO THE THOMSON ELECTRIC WELDING COMPANY, OF MAINE.

ELECTRIC METAL-WORKING APPARATUS.

SPECIFICATION forming part of Letters Patent No. 556,426, dated March 17, 1896.

Application filed April 23, 1891. Serial No. 390,207. (No model.)

*To all whom it may concern:*

Be it known that we, HERMANN LEMP and WARREN B. LEWIS, citizens of the United States, and residents of Lynn, in the county of Essex and State of Massachusetts, have invented certain new and useful Electric Metal-Working Apparatus, of which the following is a specification.

Our invention relates to the general construction of electric metal-working apparatus, as well as to details in the construction of transformers designed for applying the heating-current and to devices for automatically cutting off the flow of current in the work.

The principal purpose of our invention is to provide an organization wherein several similar operations may be performed simultaneously, but independently of one another.

Our invention is designed more particularly to provide for that class of work wherein several pieces of metal require to be united to a single piece either on the same or opposite sides thereof or at different points circumferentially around it—as, for instance, in the welding of metal spokes to metal hubs.

We have herein illustrated our invention as carried out by means of an organization of apparatus especially adapted to an operation wherein several pieces of metal are to be welded at different points around the circumference of a common piece of metal, but do not limit ourselves to the special forms of devices whereby this particular kind of work may be performed.

Our invention provides also for the electrical heating and the welding, upsetting, or other metal-working operations at a number of points simultaneously, as will hereinafter more clearly appear.

The invention consists, first, in the combination, with a work-holder properly connected to any source of heating electric currents, of two or more separate work-holders common to the first and provided with means whereby they may be moved toward it, and independent automatic cut-off devices for each of said separate work-holders controlled by the movement of the several parts of the work connected therewith each independently of the movement of other parts, whereby the flow of current in each portion of the work may be cut off or decreased independently of the others.

Our invention consists further in an organization of apparatus wherein a single work-holder forming a pole of the heating source is surrounded by a number of independently-movable work-holders also connected with the source and provided with independent automatic cut-off devices of the special character hereinafter described, or of any other suitable kind, for cutting off or lowering the flow of current in each part of the work independently of the others.

In carrying out our invention the several work-holders or supports for the work from which the work derives its heating-current may be connected with any desired source, but we prefer, for many reasons, to employ as the source the secondary of a transformer.

The cut-off mechanism or device may be of any suitable character for stopping or cutting down the flow of current through each particular portion of the work to be heated, the action of such cut-off device or mechanism being controlled by the movement of the work itself or the holder for said work.

The cut-off device may operate by interrupting the circuit of the secondary or the flow of current in the primary.

In some cases the cut-off may consist of some means for varying the self-induction, kick or counter electromotive force in the secondary circuit—as, for instance, some means for opening and closing or for variably opening and closing a magnetic circuit around the secondary conductor.

Some of the various constructions of automatic cut-off mechanisms or devices that may be employed in connection with each portion of the work will be hereinafter more particularly described.

Our invention consists also of a novel construction of transformer designed more particularly for heating purposes, and having a central or intermediate pole, constituting one terminal of the transformer, and two or more outer or exterior poles, constituting polar terminals, all of the opposite sign and provided with suitable means for holding and operating upon the work.

Our invention consists also in the special combinations of apparatus and details of construction more particularly hereinafter described and then specified in the claims.

The utility of our invention will be more readily understood from the consideration of its use in electrically welding spokes to hubs. In this class of work a hub is cast with radial lugs upon it and the spokes are welded to the said lugs, but by the previous construction of machines the welding can only be done on one spoke at a time. If the welding of all the spokes could be done at once, it is obvious that the capacity of a plant would be greatly increased. In such an operation it is obviously necessary that the welding of each spoke should be accomplished independently of the others, inasmuch as the heating may not be equally rapid at each joint. Hence the welding pressure must be applied to the spokes independently, and the discontinuance of the heating at each spoke must be accomplished independently of the others.

The utility of our invention is also evident in a case where it is required to weld the plates of a blower or fan to a central hub or shaft.

In the drawings we have illustrated a few of the types of apparatus that may be employed in carrying out our invention.

It should be understood at the outset that we do not limit ourselves to any particular construction of work-holder, clamping devices or means for applying pressure to the work and moving it; nor do we limit ourselves to any special way of controlling the strength of the current in the several parts of the work, as may be required during the operation of heating or for different sizes or nature of work. The latter devices being well understood in the art are not specifically described or shown.

In the accompanying drawings, Figure 1 illustrates in side elevation a form of work-holding device and means for applying pressure to the work or moving the same which may be employed in practicing our invention. Fig. 2 illustrates in plan a shape of transformer that may be employed for supplying the heating-currents, and shows the manner in which the terminals of the heating source or sources may be disposed with relation to one another for the purpose of supplying the heating-current to the intermediate work-holder and to the several common work-holders disposed around or at opposite sides of it. Fig. 3 is a vertical cross-section through the secondary illustrated in Fig. 2. Fig. 4 illustrates in plan a modification in the construction of the transformer and the means for cutting off or reducing the flow of current in the several parts of the work. Fig. 5 shows in side elevation a transformer similar to that illustrated in Fig. 4, with the means that may be employed for automatically cutting off the flow of current. Fig. 6 illustrates in plan a modification in the construction of the apparatus. Fig. 7 is a vertical cross-section through the apparatus shown in Fig. 6 and illustrates a modification in the construction of the secondary of the transformer. Fig. 8 shows in plan another modification in the means for cutting off or reducing the flow of current in the several portions of the work supplied from different portions of the secondary. Fig. 9 illustrates in side elevation the transformer shown in Fig. 8 and shows in detail the devices which may be used for automatically cutting off the current. Fig. 10 is a diagram illustrating the connections of the apparatus shown in Figs. 1, 2, and 3. Fig. 11 is a diagram illustrating the connections of the apparatus shown in Fig. 9. Fig. 12 illustrates a further modification in the means that may be employed for cutting off or decreasing the flow of current in the several portions of the work.

G is a terminal or pole of the source of heating electric currents and forms or carries the work-holder or support for the work to be heated. Such work-holder or support may be of any suitable construction or shape, but for the purpose of illustrating our invention we have shown it as formed directly on the terminal G and as of proper shape to hold the ring, collar, hub or other cylindrical body.

A B C D E F are other terminals or poles of a source of heating electric current constructed or combined with devices for holding portions of the work which are to be heated by the current, and are placed for that purpose in the circuit between such terminals and the work and terminal at G. Preferably the terminal G is of one polarity and the terminals A B C D E F all of the opposite polarity.

The terminals or poles A B C D E F may, as will presently appear, be separately-formed terminals, connected respectively with separate sources of heating current, or may be merged in a common mass of metal forming the terminal of a single source of energy. In the latter case it becomes necessary to correspondingly modify the means for cutting off the flow of current to each portion of the work.

The terminal G may likewise consist either of the massed terminals of different sources of energy, the opposite poles of which are located respectively at A B C D, &c., or may form the terminal of a single source of energy the opposite terminal of which is divided among the terminals A B C, &c. The terminal G massed as the common terminal of different sources of energy may be either in one piece or in separate pieces.

In the preferred manner of carrying out our invention, wherein we use a transformer secondary, we make the terminal G as a solid mass of metal forming one pole of the secondary bar or conductor, the opposite terminal consisting either of the separate blocks or pieces A B C D in some forms of our transformer and in others being merged in a single common piece.

When the terminals A B C D are formed at the ends of diverging arms extending from the block or projection G, and as illustrated in Figs. 2 and 3, there is afforded facility for using a separate secondary heating-circuit for each terminal A B C, &c. In this case the heating of each part of the work supplied from A B C, &c., may be controlled either by controlling the circuit of each primary coil applied to each of the separate arms or (when the current is introduced in all of said arms by a common coil) by controlling the self-induction or reaction in each arm of the transformer. When, however, the terminals A B C D are merged in a common piece of metal connected through undivided portions of the metal-transformer body with the terminal G and a single primary coil or circuit is employed, modifications in the cut-off devices are used, as will be presently described in detail.

The terminals A B C D, &c., carry or support any work-holding device of the character employed in electric metal-working operations, an example of which is illustrated in Fig. 1. We do not, however, limit ourselves to any such special construction, but may employ any means for holding or supporting the work in electrical connection with the terminals A B C D, &c., of the source of heating-current and any means for moving or forcing the work toward the opposite terminal G common to them. We have also illustrated in this figure the devices which may be employed as a means for cutting off the flow of current when such cut-off is effected by opening or closing any electric circuit.

In Fig. 1 the work-holder is shown as a clamp-slide 1, adapted to move in sliding connection with the terminal A, as well understood in the art, and provided with a clamping-jaw 3, adapted to hold the bar or rod 2, which is the work to be heated, down upon the slide or holder 1. The jaw 3 is operated by means of a screw 4, working through a nut 5, or by other means. Movement is imparted to the work by means of a screw 7, working against a spring 8, interposed between the screw and the work-holder. The screw compresses the spring, and when the metal heated by the current softens sufficiently the work is forced forward to effect a weld, upset the metal, or otherwise operate on it. The operating-handle may connect with the screw by means of a ratchet at 6.

A switch that is automatically brought into action by the movement of the work for the purpose of opening or closing a circuit, and thereby stopping the flow of currrent in the work, is indicated at 10. The contact of the switch is indicated at 9, and the terminals of the same connect respectively to the lever 10 and to the contact 9. A spring 13 tends to throw the switch in a direction to stop the flow of heating-current. In the construction shown the parts are arranged so that this movement is one which will open a circuit, that being the action required when the switch is placed directly in the primary circuit of the transformer. It will be obvious, however, that the parts might be relatively disposed in a different manner to bring about the cessation of the heating, as will be well understood in the art.

The switch is held in position to allow the heating to progress by means of the catch 11, which is placed in position to be engaged by an arm 12, moving with the work, the arm for such purpose being mounted on the slide or work-holder which supports the work and carries it forward. The switch devices shown are simply typical of any electric switch that may be automatically released or operated through the movement of the work.

In the welding operation when the work moves forward after softening at the point of welding the arm 12 strikes the detent-lever 11, releases the switch 10, and thereby causes the discontinuance of the heating in the particular portion of the work whose movement forward operates the switch.

In the form of our invention illustrated in Figs. 2 and 3, the central hub or terminal G and the six radial arms terminating at A B C, &c., are preferably formed as a single casting. In connection with each arm there is an iron core $a$ and a suitable primary winding P for each arm and core, thus producing in effect six separate transformer secondary circuits, the primary of each of which may be independently controlled. Each of the terminals A B C D, &c., is provided with a suitable work-holding device—such, for instance, as that illustrated in Fig. 1—and in connection with each is used a suitable switch controlling the primary of the arm upon which the work holder or support is mounted. The primaries may be connected to separate branches or suitable supply-mains, as indicated in the diagram, Figs. 11 and 12, the circuits being taken through the switches 10, controlled independently of one another.

Assuming that each of the work-holders 1 carries a spoke clamped therein and placed against a hub or projections from a hub secured to the opposite terminal G, the operation would be as follows: The switches 10 being closed and the several springs 8 having been put under pressure, the current is turned onto the apparatus by the usual or any suitable means, and the heating commences in all of the spokes or bars. Should one joint heat more rapidly than the rest it will weld, and as the work moves forward the particular switch 10 used in connection therewith will be opened, thus practically cutting off the flow of current in that particular spoke or arm of the work. The heating continues in the meantime at other portions of the work, and as each weld is effected the current is shut off from such portion by the opening of the primary circuit.

It will be obvious that this organization of apparatus may, by suitable modifications in the relative disposition of the parts, be used for effecting a number of welds simultaneously either on the same or opposite sides of the same common piece and in any desired positions upon it.

It will also be obvious that the number of the terminals A B C D, &c., may be changed without departing from our invention, a greater or less number being employed according to the character of the work to be done.

In a modification of our invention to be presently described we have made provision for changing the relative position of the work-holders with relation to the common terminal or holder G.

In the modification of our invention illustrated in Fig. 4 there are but four exterior terminals common to the terminal G, and the transformer secondary is of similar construction to that shown in Fig. 2, but the currents are set up in the several arms by means of a primary and iron core common to said arms. In this instance there are in effect, as before, a number of secondary circuits; but as the primary is common to them all it becomes desirable to use other means in place of a switch in the primary for cutting off the flow of current to the several portions of the work supplied from the terminals A B C D, &c.

24 is the iron core around which the primary is wound, which core is slipped over the central part or terminal G, as indicated. The secondary circuit being subdivided by means of the arms, the flow of current in the several portions of the work may be cut off or sufficiently decreased by suitably modifying the resistance in the several arms or branches. For this purpose we propose to introduce a counter electromotive force or self-inductive resistance to the flow of the currents in the secondary by varying the closure of a magnetic circuit in the field of induction of said secondary current or by other means.

As indicated, each of the arms or branches of the compound secondary is provided with an iron core 14, 15, 16 or 17, which has a gap at one or more points that may be closed or filled by means of magnetic bridges or blocks of iron. (Indicated at 14ᵃ 15ᵃ, &c.) When the block or bridge fills the gap the reaction to the flow of the secondary currents is at its maximum, while when the magnetic circuits are open, which is the case when the bridges are in the position illustrated in Fig. 4, then the secondary currents may flow with comparative freedom.

The gaps in the magnetic circuits 14 15, &c., are preferably closed automatically, for which purpose the magnetic bridges may be connected with the work so as to move therewith in the manner indicated in Fig. 5, where the work-holder 1, which supports the work and moves with it, is connected with a lever 19, pivoted at 23 and joined by a link 20 to the lever 22, pivoted at 21 and carrying on its longer arm the magnetic bridge-piece. The parts are so arranged that as the work moves forward in the welding or other operation the magnetic bridge-piece is moved so as to close the magnetic circuit on the arm of the secondary. Each clamp or holder is provided with a similar device, so that the independent movement of each causes the closing of the gaps in the magnetic circuits of the four arms severally and independently.

The electrical action is as follows: The work being in place and the bridge-pieces in the position indicated in Fig. 5, the main primary circuit is closed and each of the four joints begins to heat more or less rapidly. As one attains a welding-temperature and the clamp-slide carrying the rod or bar moves forward, the bridge moves into the gap and completes the magnetic circuit about the secondary conductor or arm of the secondary conductor which supplies that portion of the work. The alternating current in said secondary conductor magnetizes the core and an inductive resistance is created, causing a "kick," so that the current in the portion of the work supplied thereby is decreased sufficiently to prevent overheating of the joint. Each part of the apparatus operates independently in the manner described as the portion of work supplied thereby reaches the proper temperature. When all four portions of the work are completed the main switch may be opened, the welded article removed, and the clamp-slides or holders 1 drawn back, thus opening the four magnet-circuits again.

Figs. 8 and 9 illustrate a further modification of the invention and show another form of cut-off device that may be employed for stopping or decreasing the flow of current in the several portions of the work. The general construction of the transformer primary and iron core is the same as illustrated in Fig. 4. The primary coils are wound in sections and afterward connected together. Auxiliary iron cores 27 28 29 30 are provided for each secondary circuit or arm of the transformer secondary, the auxiliary iron cores in this case, however, preferably having their magnetic circuit closed. Each auxiliary core may be formed by means of a U-piece, the free ends of which abut against the common central core 24. On each of the auxiliary cores is wound a coil of wire 27ᵃ 28ᵃ 29ᵃ 30ᵃ. The circuits of these coils are governed individually by suitable switches automatically operated by the movement of the work, as indicated in Fig. 9, and in the same manner as already described. These coils may be used in various ways to vary the flow of current in the several secondary circuits or portions of the compound secondary conductor. For instance, the coils may be connected to a source of alternating current, as indicated in Fig. 11, where the coil 27ᵃ is shown as connected to the wire or circuit which feeds the primary coil or coils P. The connection from the supply-wire is through the switch 10, and the proper terminals of the coil are connected to the supply-wires, preferably, in such way that they will magnetize their cores in the proper direction to help the main core in generating current in the arm or branch of the secondary to which the auxiliary core is applied, thus causing the part of the work supplied from said arm or branch to quickly and rapidly heat up.

The circuits of the several coils 27ª 28ª 29ª 30ª are controlled each by a suitable switch 10, operated upon the same portion of the apparatus with the coil. When the pieces of work are in the clamps or holders on the said exterior terminals, and before the welding has taken place, the circuit of each auxiliary coil is closed through the switch 10, and when the current is turned on through the apparatus the coils help in generating the heating-current. When the work on any terminal moves up after it has become softened, the corresponding switch 10 is opened and the circuit of the coil being open the current in the arm or branch of the secondary is subjected in the manner before described to the inductive resistance due to the presence of the iron core or mass of iron forming the magnetic circuit around said branch. The result of this is that the heating-current is cut down in that branch or portion of the secondary circuits. The coils on said auxiliary cores might, as indicated in Fig. 12, be connected through a reversing-switch with the source of alternating currents which would be applied at the start of the operation in the proper way to assist the heating. When the work moves forward, the switch would be reversed, with the effect of setting up a positive opposition to the flow of currents in the particular branch of the secondary affected, and by proper proportions of the parts absolutely stopping the flow of current in the part of the work supplied from such secondary or portion of secondary.

In the modification of our invention illustrated in Figs. 6 and 7 we have shown the transformer secondary as formed of a mass or body of metal, the central portion of which consists of a stud or projection G, forming one terminal, while the rim of the mass of metal constitutes the other terminal and terminates in a ring 49, adapted to support the work or the work-holders opposite the terminal G. In this construction the pole opposite the pole G is a continuous mass of metal which takes the place of the separate terminals, Fig. 2, the latter being in the present instance merged in a common mass of metal. Preferably the exterior rim is connected with the central projection by an imperforate or undivided mass of metal and there is in effect but one transformer-circuit in which the currents converge to or spread from the central pole over a disk or plate of metal to the continuous rim or terminal 49. This construction gives a secondary which may be defined as a cup-shaped metal body having a central projection G, forming one terminal, and the rim or edge of the cup forming the opposite terminal. The iron core of the transformer is placed in the cup and surrounds the central projection, the core being wound, as indicated, with suitable primary wires or coils P, as before. Six work-holders or clamp-slides are indicated at 32, 33, 34, 35, 36 and 37, each of which, as well understood in the art, is to be guided by appropriate mechanical guides and slides in contact with the rim or terminal 49. In the present case the clamp-slides are shown backed by a fluid-pressure device consisting of a cylinder and piston, by means of which the work may be moved toward the inner or intermediate terminal G. Each of the slides is provided with the proper clamping device, such as indicated, upon the slide 35, which shows a vise as typical of the means that may be employed for each work-holder. With this construction of transformer we provide means for making and breaking the secondary circuit of the current flowing through the work to stop the heating of the several portions of the work. For this purpose we construct each slide or work-holder so that it may form a circuit making and breaking connection with the current-supply bed or rest on which it moves with the work.

As shown more clearly in Fig. 7, the bottom of the slides are provided with insulating-spaces which are adapted to register with insulating-spaces or conducting-spaces on the terminals or beds upon which the slides rest and over which they work.

In Fig. 7 the slide 32 is shown in position to complete the secondary circuit, which is the position that it has at the beginning of an operation. The slide 35 is shown as having been moved forward with the work, so as to break the connection. It is preferable to use a number of insulating-spaces upon the bed and the slide and to make each of the several surfaces of contact comparatively short in the direction of movement of the slide, thus at the same time providing a large contact-area and yet causing a break of the circuit by a comparatively short movement.

The several work-holders or clamp-slides, Fig. 6, being supported upon a bed or rest of considerable extent circumferentially may be adjusted transversely to the line of movement of the work and into different positions with regard to the intermediate holder or electrode of the machine. They may thus be set to perform the operation at different parts of the piece of metal carried by the intermediate or opposite electrode G, and by making them detachable the machine may be operated with a different number of slides—either two, four, or six—and in every case the work may be done at points equal distances apart around the metal held by the central or intermediate electrode. This principle may, of course, be carried out in connection with any number of work-holders, dependent upon the length of the bed upon which the several holders rest and the number which may be arranged side by side upon the same.

The operation of an apparatus such as indicated in Fig. 6 is substantially the same in its general features as that of the forms herein previously described, in that each portion of the work carried by the slides or holders opposite the common electrode G may have the heating-current cut off from it automatically and independently of the others.

What we claim as our invention is—

1. In an electric metal-working apparatus, the combination substantially as described, of a work-holder connected to a source of heating electric currents, two or more separate work-holders common to the first and provided with means whereby they may be moved toward it, and independent automatic cut-off devices controlled by the movement of the several parts of the work independently of one another whereby the flow of current in each may be cut off or decreased independently of the others.

2. In an electric metal-working apparatus, the combination substantially as described, of a central or intermediate work-holder connected to one pole of a source or sources of electric energy, two or more separate work-holders connected to an opposite pole or poles of a source or sources and provided with means for moving the work toward the portion of work connected to the central or intermediate pole, and independent automatic cut-off devices for the several parts of the work, actuated or controlled through the movement of the work toward the central or intermediate work-holder.

3. In an electric metal-working apparatus, the combination with a central or intermediate work-holder or electrode, of two or more electrodes or work-holders arranged around the same, and independent cut-off mechanisms controlled by each movable clamp or work-holder whereby the flow of current to each may be cut off or stopped at a predetermined point in the movement thereof independently of the movement of the others.

4. In an electric metal-working apparatus, the combination of an intermediate work-holder constituting a pole of two or more heating-circuits, and exterior work-holders of polarity opposite to that of the intermediate pole, said exterior work-holders being connected with separately-controllable sources of electrical energy each governed by the movement of the work-holders toward the central or intermediate pole, as and for the purpose described.

5. In an electric metal-working apparatus, the combination of an intermediate work-holder constituting a pole of a number of heating-circuits and exterior work-holders of polarity opposite to that of the intermediate or central pole and forming poles for sources of electric energy controllable independently of one another, and automatic cut-off mechanisms governed by the movement of the work for cutting off or decreasing the heating-current at a predetermined point in the movement of the work connected to each holder, independently of the movement of the portions of the work in the other holders.

6. In an electric metal-working apparatus, the combination substantially as described, of a work holder or support on one terminal of a transformer secondary or secondaries, and two or more work-holders common to the first and mounted opposite to the same on an opposite terminal of said secondary or secondaries and each provided with an automatic cut-off for cutting off or lessening the flow of current through the work in said holder independently of the others.

7. In an electric metal-working apparatus, the combination with a compound transformer having a common central or intermediate secondary pole forming a pole common to two or more secondary bars or conductors, of movable work-holders upon the exterior poles of said secondaries, and mechanism adapted to control the flow of current in the said secondary circuits independently of one another and governed respectively by the movement of the work-holders connected to the said exterior poles.

8. In an electric metal-working apparatus, the combination substantially as described, of a work holder or support forming one electrical terminal of a transformer secondary or secondaries, two or more separate work-holders common to the first and mounted on a support or supports constituting an opposite terminal of said transformer secondary or secondaries and provided with means whereby each work-holder may be moved toward the intermediate central holder or support independently of the others, and independent cut-off devices controlled by the movement of the several parts of the work whereby the flow of current in each may be cut off or decreased independently of the others.

9. In an electric metal-working apparatus, the combination substantially as described, of a work-holder constituting a pole of one or more heating transformer-circuits the opposite poles of which are arranged in a circle around the first, movable work-holders mounted upon said opposite poles, and cut-off mechanisms controlled by the movement of said work-holders independently of one another whereby the flow of current in each portion of the work may be decreased or stopped independently of the flow in the other portions.

10. In an electric metal-working apparatus, the combination substantially as described, of a work-holder constituting a pole of two or more heating transformer secondary circuits, the opposite poles of which are arranged around the first, a separate primary for each secondary, movable work-holders mounted upon the said opposite poles, and cut-off mechanisms controlled by the movement of said work holders or clamps and governing the flow of current in the primaries of said transformers independently of one another, as and for the purpose described.

11. In an electric metal-working apparatus, the combination substantially as described, of a body of metal constituting a transformer secondary and having a central or intermediate pole or projection surrounded by one or more exterior poles or projections constituting an opposite pole or poles of said secondary, a series of work-holders mounted on the latter and adapted to move the work toward the central pole, and an automatic cut-off mechanism controlled or actuated by each clamp or holder.

12. In an electric metal-working apparatus, the combination substantially as described, of a transformer having a secondary composed of a cup-shaped body provided with a central projection constituting one pole of the apparatus, a series of work-holders mounted on the rim of the secondary, and an independent automatic cut-off for each work-holder, as and for the purpose described.

13. In an electric metal-working apparatus, the combination substantially as described, of a work-holder, a support forming one terminal of a secondary circuit or circuits, and two or more work-holders common to the same and mounted in electrical connection with a mass or masses of metal, all of the same polarity, forming an opposite terminal of said secondary circuit or circuits.

14. In an electric metal-working apparatus, the combination substantially as described, of a body of metal composing a transformer secondary and having a central or intermediate pole or projection of one polarity supporting one part of the work, one or more exterior poles or projections constituting the opposite pole, and two or more work-holders mounted on the latter and independently movable thereon.

15. In an electric metal-working apparatus, the combination substantially as described, of a number of transformer secondary circuits connected at a common central or intermediate pole of one sign to a work-holding terminal of the apparatus, and exterior poles all of the opposite sign arranged around the first and each provided with suitable work holding and operating appliances, whereby the work may be moved toward the portion of work connected to the central or intermediate pole.

16. The combination in an electric metal-working apparatus, of a transformer having a secondary composed of a body of metal comprising a central projection and one or more exterior projections arranged circumferentially around the first, to constitute an opposite pole of the transformer, a core surrounding the central projection, a primary coil, and a series of work-holding clamps mounted on the exterior pole or poles and surrounding the central pole.

17. In a metal-working apparatus, the combination substantially as described, of a secondary consisting of a body of metal having a central polar projection constituting a pole and support for the work, and a series of work-holders surrounding the said projection and electrically connected to the edge or rim of the body of metal constituting the opposite pole.

18. In a transformer, a secondary consisting of a solid piece of metal having a central hub or projection forming one pole, and an opposite pole or poles arranged around the first and united with the same.

19. A transformer secondary having one solid central pole of one polarity and a number of poles of the opposite polarity forming the terminals of divergent radial arms extending from and integral with the central pole.

20. In a transformer, a secondary having a central pole of one polarity, and a pole or series of poles of opposite polarity ranged around the central or intermediate pole.

21. In a transformer, a secondary consisting of a solid metal piece having a central hub or projection and two or more arms extending therefrom, and one or more primary circuits or conductors adapted to produce secondary currents of the same sign or direction in all the arms.

22. In a transformer, a secondary having a central pole of one polarity common to two or more exterior poles of opposite polarity, in combination with an iron core surrounding the central pole, and a primary circuit acting on said core.

23. In a transformer, the combination substantially as described, of a secondary having a central or intermediate pole of one sign, two or more arms radiating or extending therefrom and terminating in poles all of a sign opposite to that of the central or intermediate pole, and a separate core and primary for each arm.

24. A compound transformer having a secondary as described provided with two or more exterior polar projections, and a central or intermediate pole or poles massed together, a core surrounding said central or intermediate pole, and independent iron cores for the exterior pole or poles.

25. In a compound transformer, a secondary composed of two or more exterior poles and an intermediate pole or poles massed together, in combination with a core and primary common to the whole transformer, and supplemental cores independent of one another for the several exterior poles of the secondary.

26. In a transformer, the combination substantially as described, of two or more exterior poles, a central or intermediate pole common to them, a core surrounding said intermediate pole, a primary common to the whole transformer, and supplemental iron cores for the said several exterior poles.

27. In a compound transformer, the combination substantially as described, of two or more exterior poles, a central or intermediate pole made in one or more pieces and common to said exterior poles, a core and primary common to the whole transformer and applied to said intermediate or central pole, supplemental independent iron cores for the exterior poles, and means for varying the magnetic closure of the iron circuits for the latter cores.

28. In a transformer, a secondary comprising a central hub or portion having two or more arms integral with it, in combination with an iron core and coil applied over the central hub or portion, and supplemental cores applied to the arms independently of one another and provided with means for varying their magnetic reaction, as and for the purpose described.

29. A transformer having a secondary composed of a central or intermediate hub or pole provided with a number of arms the terminals of which constitute an opposite pole, in combination with an iron core surrounding the central pole, a primary therefor, and supplemental iron cores surrounding the independent arms and provided with means for varying the magnetic closure of a gap in the magnetic circuit of the core.

30. In a transformer, having a secondary provided with a central or intermediate pole or poles common to two or more exterior poles forming the terminals of arms diverging or extending from the central pole or poles, in combination with an iron core and primary coil applied to the central pole, and means for varying the self-induction or kick in the diverging arms independently of one another, as and for the purpose described.

31. In a transformer having a secondary provided with a central or intermediate pole or poles common to two or more exterior poles forming the terminals of arms diverging or extending from the central pole or poles, in combination with an iron core and primary coil applied to the central pole, and means applied to each of the diverging arms and independent of the means applied to the others for producing an artificial self-induction or reaction in the circuit of said secondary.

32. The combination in an electric metal-working apparatus, of a transformer, the secondary of which supplies the heating-current, a movable work-holder, and mechanism controlled thereby for governing the counter electromotive force or reaction in the secondary whereby the flow of current may be cut down when the work has moved to a predetermined extent.

33. In an electric metal-working apparatus, the combination with a transformer having an iron core for its secondary, of means for supplying current to the work from said secondary, a movable work-holder, and mechanism controlled by said work-holder for changing the closure of the magnetic circuit of said core.

34. The combination in an electric metal-working apparatus, of a transformer the secondary of which supplies the heating electric current, an iron core for said transformer, and a magnetic bridge-piece controlled by the movement of the work-holder of the machine and serving to close a gap in the magnetic circuit of the iron core, as and for the purpose described.

35. In an electric metal-working apparatus, the combination substantially as described, of a transformer the secondary of which supplies the heating-current, an iron core the magnetic reaction of which varies the flow of current in said secondary, an armature or magnetic-circuit-closing piece for said core, and means for varying the position of said piece controlled by the movement of the work whereby the flow of current in the work may be governed automatically.

36. The combination substantially as described, in a metal-working apparatus, of two or more secondary transformer-circuits supplying different parts of the work, an independent iron core for each, and means for varying the closure of the magnetic circuit of said core controlled by the movement of the portions of work supplied respectively from said secondary circuits.

37. The combination substantially as described, in an electric metal-working apparatus, of a transformer, the secondary of which supplies the heating-current for the work, an iron core or magnetic circuit applied to the secondary, a bridge or armature for said circuit, and a movable work-holder connected with and adapted to actuate said bridge or armature.

Signed at Lynn, in the county of Essex and State of Massachusetts, this 14th day of April, A. D. 1891.

HERMANN LEMP.
WARREN B. LEWIS.

Witnesses:
HELEN McDOUGALL,
JOHN W. GIBBONEY.